Aug. 10, 1943.  W. S. SCHUM  2,326,691
FREE FLOW LIQUID FUEL FILTER
Filed April 7, 1941
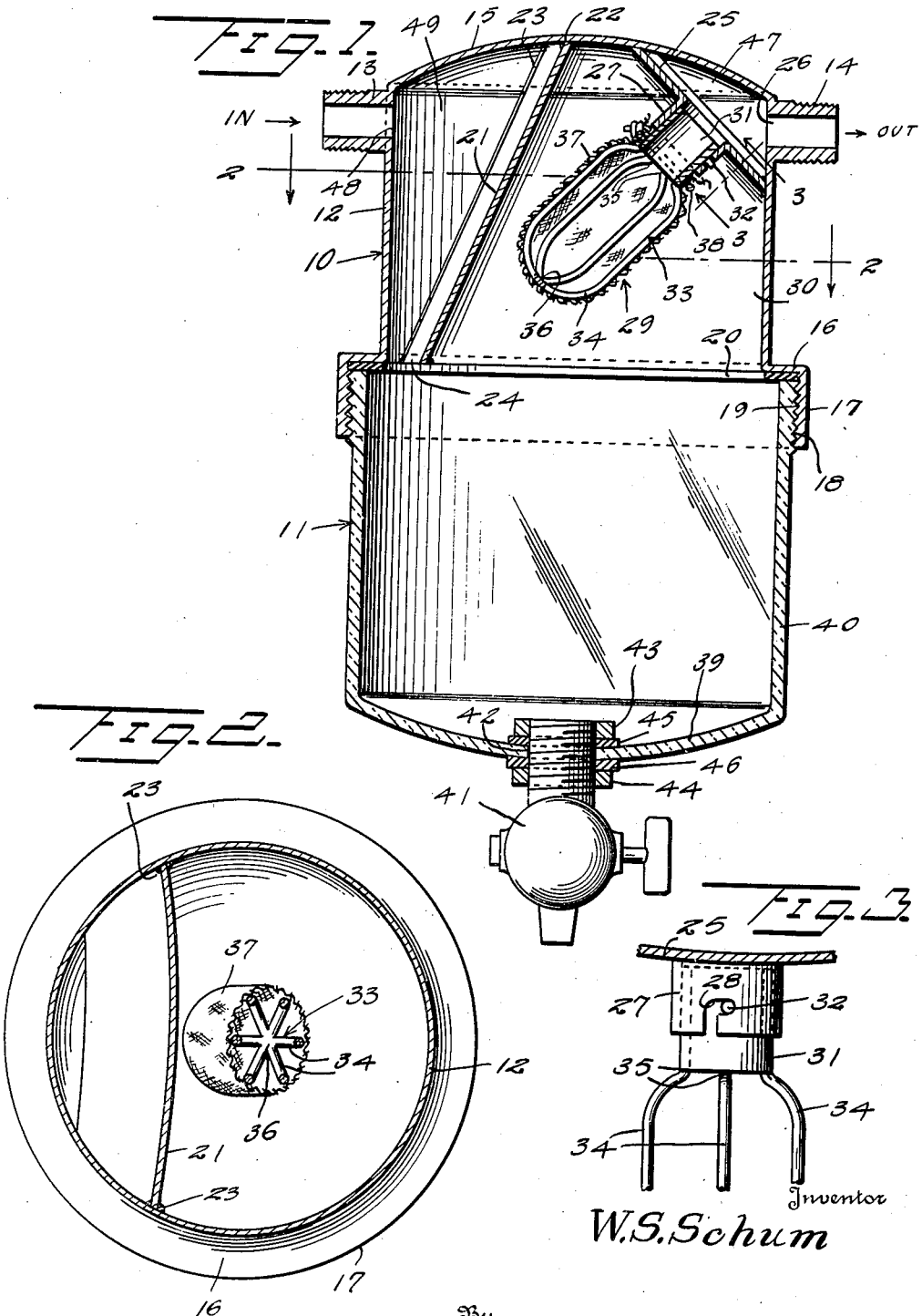

Patented Aug. 10, 1943

2,326,691

UNITED STATES PATENT OFFICE 2,326,691

FREE FLOW LIQUID FUEL FILTER

Walter S. Schum, Kinzers, Pa.

Application April 7, 1941, Serial No. 387,290

2 Claims. (Cl. 210—165)

This invention relates to liquid filters, and more particularly to a filter for liquid fuel, such as gasoline or the like.

An object of this invention is to provide a filtering device including a well or reservoir and a cap on the well, the cap including a filter element and a baffle adjacent the element so that the incoming fuel will flow from the intake downwardly into the well where the sediment and water will separate or settle from the liquid, and then the liquid will flow upwardly into the cap on the opposite side of the baffle and pass through a filter element which is adapted to remove any floating sediment which may be stirred up from the settling receptacle or may be too light to settle.

Another object of this invention is to provide a filtering device of this kind which may be interposed in a fuel line on either side of the fuel pump and which will give a visible indication of the condition of the fuel and the amount of sediment in the receptacle.

A further object of this invention is to provide a filtering device of this kind wherein the filtering element may be readily removed for cleaning or replacement and which includes a means for holding the filtering element against collapsing.

To the foregoing objects and to others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a vertical section taken through a free flow liquid fuel filter constructed according to an embodiment of this invention, Figure 2 is a sectional view taken on the line 2—2 of Figure 1, and Figure 3 is a sectional view taken on the line 3—3 of Figure 1 with the filter element removed from the supporting frame or cage.

Referring to the drawing the numeral 10 designates generally a cap structure which is mounted on a transparent receptacle or sediment collector 11. The cap 10 includes a cylindrical body 12, which is provided adjacent the upper end portion thereof with an intake nipple 13 and at a diametrically opposite point with an outlet nipple 14. The nipples 13 and 14 are adapted to be interposed in a fuel line and preferably are interposed in the intake side of the fuel pump. The body 10 is provided with a dome-shaped top wall 15 and is provided at the lower end of the cylindrical side wall 12 with an outwardly extending flange 16. An annular flange 17 disposed at right angles to the flange 16 is formed integral with the flange 16 and is provided with interior threads 18 which are adapted to engage exterior threads 19, which are formed on the receptacle 11 adjacent the upper end portion thereof. An annular or ring-shaped gasket 20 is interposed between the flange 16 and the upper edge of the receptacle 11, so as to provide a liquid seal at the upper end of the receptacle 11 and the lower end of the cap or filtering body 10.

The body or cap 10 is provided inwardly from the intake nipple 13 with a transversely arcuate downwardly and outwardly inclined baffle 21 having the concave side thereof confronting the nipple 13. The upper end of the baffle 21 is secured as by solder or other fastening means 22 to the inner side of the top wall 15, and the opposite edge portions of the baffle 21 are secured as by solder or other fastening means 23 to the cylindrical side wall 12. The lower end of the baffle 21 is disposed in inwardly spaced relation to the lower end portion of the side wall 12 thereby providing a fluid passage 24, which communicates with the receptacle 11.

The cap or filter body 10 is also provided with a second transversely arcuate combined baffle and filter element supporting member 25, which is secured to the top wall 15 and the side wall 12. The baffle 25 has the concave side thereof confronting the outlet port 26, which communicates with the outlet nipple 14 and the baffle 25 is inclined in a direction opposite from the inclination of the baffle 21, as shown in Figure 2. The baffle 25 has secured thereto a cylindrical nipple 27, which is formed with an L-shaped slot 28 opening through the inner end portion thereof. A filter element, generally designated as 29, is adapted to removably engage the nipple 27 and to extend inwardly of the outlet chamber 30 formed between the convex sides of the two baffles 21 and 25.

The filtering element 29 includes a cylindrical base or coupling member 31, which is provided with a pin 32 engageable in the L-shaped slot 28 so as to thereby hold the sleeve or coupling member 31 within the sleeve or nipple 27. A wire cage, generally designated as 33, is secured to the coupling sleeve 31 and comprises a plurality of looped radially arranged wires 34, which are secured to the inner end portion of the sleeve 31, as at 35, and which have their outer end portions secured together as at 36. The looped wires 34 constitute a supporting means for a pervious filtering element 37, which is adapted to enclose or encompass the frame structure 33 and which also has a portion thereof engaging about the inner end portion of the sleeve 31 and secured thereto by a removable clamping band or wire 38. The filtering element 37 may be in the form of a chamois or other pervious means which will permit the passage of fuel therethrough, but which will remove any foreign matter within the fuel.

The receptacle 11 is provided with a concave bottom wall 39 formed integral with the side wall 40 thereof and a drain cock 41 is mounted in an opening 42 provided in the center of the bottom wall 39. The drain cock 41 is secured in the opening 42 by means of inner and outer clamping nuts 43 and 44. Preferably a gasket 45 is interposed between the nut 43 and the inner face of the bottom wall 39 and an outer gasket 46 is interposed between the outer or lower nut 44 and the outer side of the bottom wall 39.

In the use and operation of this filtering device the filtering head or cap 10 is adapted to be interposed in a suction fuel line, preferably on the suction side of a fuel pump or the like. The suction from the pump will draw the liquid from outlet chamber 47 which is positioned between the concave side of the baffle 25 and the outlet port 26. The liquid fuel will be drawn through the filtering element 37 from the outlet chamber 39. The incoming fuel will enter the nipple 13 and pass through the intake port 48 into the baffle chamber 49. The fuel will then flow downwardly and enter the receptacle 11 through the passage 24. The incoming fuel entering the receptacle 11 will then rise into the outlet chamber 30. In operation the entire filtering structure will be filled with a liquid which will flow from the intake port 48 to the outlet port 26.

The heavier sediment including globules of water will be deposited in the concave side of the bottom wall 39 of the receptacle 11 and may be drained from the receptacle by opening the petcock 41. In the event it is desired to thoroughly clean the receptacle 11 this receptacle may be unthreaded from the hood or cap 10 and then emptied from the upper end thereof and cleaned with a rag or other implement. The receptacle 11 is preferably formed of transparent material so that the condition of the fuel therein will be readily visible so that the user of this device can determine the necessity of cleaning the device without first removing the receptacle 11.

The provision of the open cage structure 33, which engages within the filter element 37 will provide a means whereby the filter element may be of flexible material and the flexible material will be held against collapsing by means of the open cage structure 33. This device may be manufactured at a relatively small cost and due to the simplicity thereof it can be readily connected with the fuel line of an internal combustion engine without disturbing any of the present parts of the engine. Where it is necessary or desirable to either clean or replace the filter element 37, this may be readily done by removing the receptacle 11 and then disconnecting the filtering member 29 including the filter element 37, the cage 33 and the coupling sleeve 31. The filter element 37 may then be removed from the cage 33 by loosening clamping band 38 and a new or clean element substituted therefor.

What I claim is:

1. In a fluid filtering device, a lower receptacle open at its upper end, an inverted upper receptacle secured to the upper end of said lower receptacle, said upper receptacle including a cylindrical side wall and a dome-shaped top wall, an inlet nipple carried by said side wall adjacent the upper portion thereof, an outlet nipple diametrically opposed to said inlet nipple, an elongated baffle fixed along its longitudinal and top edges to the inner surfaces of the side and top walls and inclined upwardly and inwardly, the lower edge of said baffle being spaced from said side wall to thereby provide a lower outlet communicating with said lower receptacle, said baffle at its upper portion confronting the inner end of said inlet nipple and forming an inlet chamber, said inlet chamber gradually reducing toward said lower outlet, a second baffle fixed at its lower and side edges to said side wall and fixed at its upper edge to said top wall at a point spaced from the upper edge of said first baffle, said second baffle being inclined upwardly and inwardly and confronting the inner end of said outlet nipple to thereby form an outlet chamber, a downwardly and inwardly inclined nipple carried by said second baffle, a flexible filtering element, and frame-like means supporting said element from said latter nipple, said supporting means disposing said element on a downwardly and inwardly disposed inclination entirely within said upper receptacle.

2. In a fluid filtering device, a lower receptacle open at its upper end, an inverted upper receptacle secured to the upper end of said lower receptacle, said upper receptacle including a cylindrical side wall and a dome-shaped top wall, an inlet nipple carried by said side wall adjacent the upper portion thereof, an outlet nipple diametrically opposed to said inlet nipple, an elongated baffle fixed along its longitudinal and top edges to the inner surfaces of the side and top walls and inclined upwardly and inwardly, the lower edge of said baffle being spaced from said side wall to thereby provide a lower outlet communicating with said lower receptacle, said baffle at its upper portion confronting the inner end of said inlet nipple and forming an inlet chamber, said inlet chamber gradually reducing toward said lower outlet, a second baffle fixed at its lower and side edges to said side wall and fixed at its upper edge to said top wall at a point spaced from the upper edge of said first baffle, said second baffle being inclined upwardly and inwardly and confronting the inner end of said outlet nipple to thereby form an outlet chamber, said first and second baffles being of transversely arcuate configuration with the concave sides facing outwardly, a downwardly and inwardly inclined nipple carried by said second baffle, a flexible filtering element, and frame-like means supporting said element from said latter nipple, said supporting means disposing said element on a downwardly and inwardly disposed inclination entirely within said upper receptacle.

WALTER S. SCHUM.